July 31, 1956  J. G. INGRES  2,757,251
GOVERNOR
Filed Oct. 19, 1953
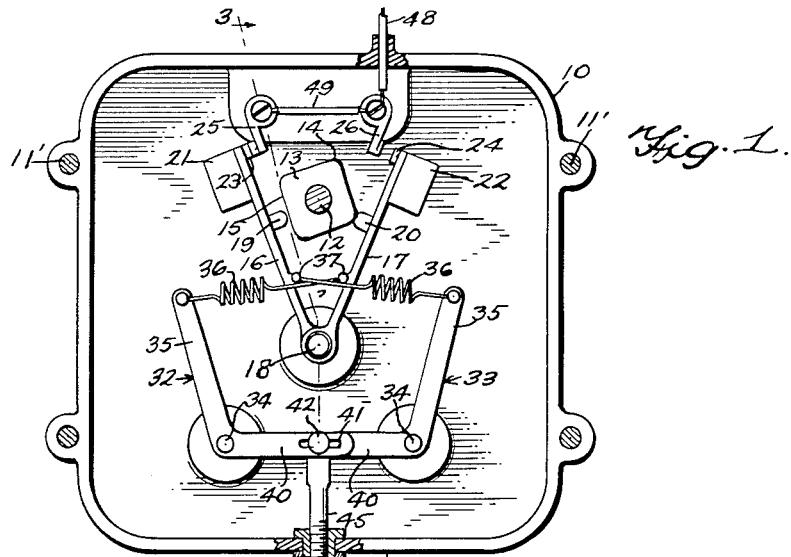
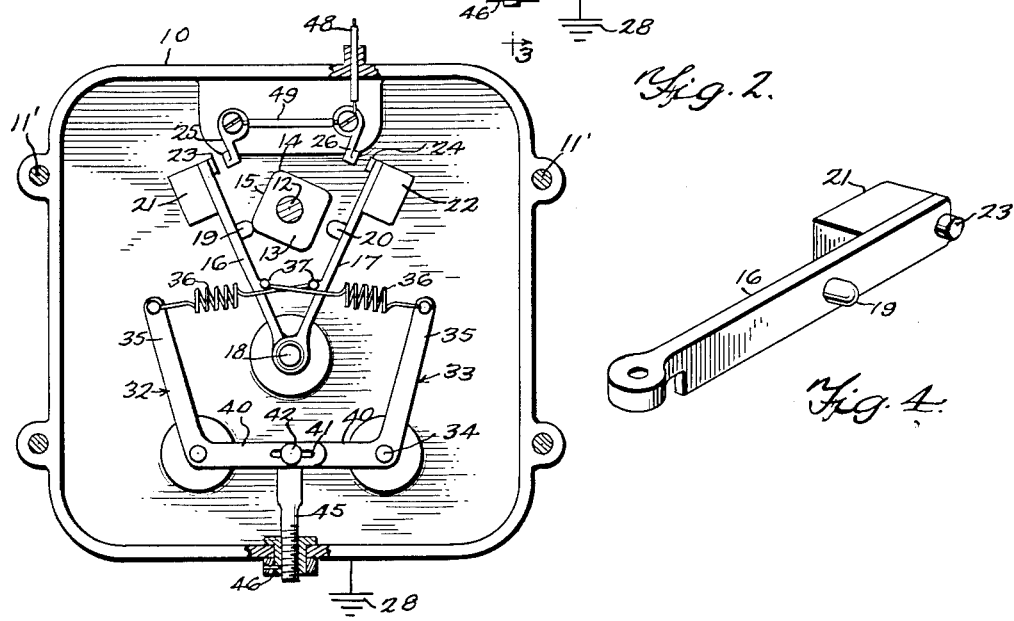
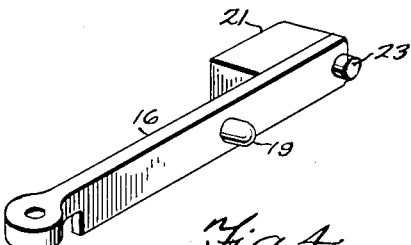
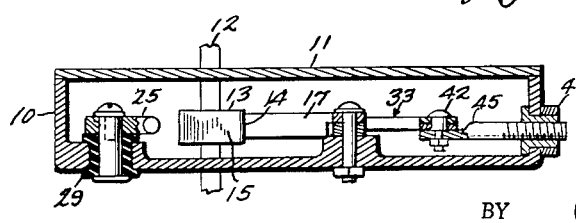
INVENTOR
JEANNOT G. INGRES
BY John F. Phillips
ATTORNEY

United States Patent Office 2,757,251
Patented July 31, 1956

2,757,251
GOVERNOR

Jeannot G. Ingres, Dearborn, Mich., assignor to Automatic Shifters, Inc., Richmond, Va., a corporation of Virginia Application October 19, 1953, Serial No. 386,941

9 Claims. (Cl. 200—61.46)

This invention relates to governors, and more particularly to a governor-controlled electric switch device.

In motor vehicles it is frequently desirable to provide a governor control for some type of device, for example, a device for controlling a shift down from the driving range to the low-speed range of the torque converter. Various other devices can be controlled by such a governor mechanism. The simplest way to install and operate a speed governor is by driving the device from the speedometer shaft of the vehicle. However, such shaft is relatively frail in construction, since it is not normally called upon to withstand substantial loads. Therefore, the driving of a weight-controlled speed governor from the speedometer shaft is frequently destructive to such shaft in the rapid acceleration and deceleration of the vehicle due to the inertia loading of the speedometer shaft.

An important object of the present invention is to provide a novel type of governor adapted to be driven by any rotary shaft and particularly adapted to be driven by a vehicle speedometer shaft wherein the controlling operation is provided without the driving of weights by the shaft.

A further object is to provide such a governor construction wherein the shaft is called upon to drive only a simple relatively light rotary cam, and to provide weight arms movable by such rotary cam and embodying the inertia means for controlling a device or electric circuit in accordance with the speed of the vehicle.

A further object is to provide such a device which embodies an extremely simple means for varying the speed at which the governor-operated device becomes effective or ineffective.

A further object is to provide a device of this character wherein the cam driven by the shaft is preferably polygonal and symmetrical and wherein preferably two weight arms are arranged to be controlled by the cam and are arranged out of phase with the faces thereof whereby, below a certain shaft speed, at least one weight arm will be in its inner position to close a switch, while the other weight arm will be in an outer switch-open position relative to a second switch, and wherein above a predetermined speed, the weight arms will not follow the contour of the cam because of the inertia of the weights, under which condition, both switches will be open to accomplish any desired result.

Other objects and advantages of the invention will become apparent during the course of the following description.

In the drawing I have shown one embodiment of the invention. In this showing

Figure 1 is a plan view of a governor casing showing the governor mechanism in elevation therein, the cover being removed, Figure 2 is a similar view showing representative positions of the weight arms above a predetermined shaft speed, Figure 3 is a detailed sectional view on line 3—3 of Figure 1, and Figure 4 is a detail perspective of one of the weight arms.

Referring to Figures 1 and 2, the numeral 10 designates a suitable casing for the device which may be provided with a cover 11 (Figure 3), fixed into position by screws 11'. Any suitable means may be employed for fixing the casing 10 in a desired position relative to the shaft which is to be utilized for controlling the governor. The present device is particularly intended for use with a vehicle speedometer drive shaft and such shaft has been indicated generally by the numeral 12, extending through the casing 10. Within such casing, the shaft 12 is provided with a cam 13, shown in the present instance as being relatively square with rounded high points 14 and relatively flat low points 15. It will become apparent that the cam 13 may be of any generally polygonal shape, so long as it is symmetrical, and the faces 15, of course, need not be perfectly flat.

A pair of relatively movable control members, preferably in the form of arms 16 and 17 are connected at their lower ends to a common pivot pin 18 carried in any suitable manner by the bottom of the casing 10. These arms carry mechanical contact bosses or abutments 19 and 20, respectively, and these bosses are adapted to contact with the cam 13 during rotation thereof as will become apparent. The arms 16 and 17 carry weights 21 and 22, respectively, to provide the necessary inertia for the operation of the device as will become apparent.

At or adjacent their free ends, the arms 16 and 17 carry contact elements 23 and 24 respectively engageable with stationary contacts 25 and 26 supported by the bottom of the casing 10. The device is shown in the present instance as being adapted for controlling an electric circuit, and to this end, the pivot pin 18 is grounded in the casing 10, while this casing, in turn, is grounded as at 28 on the frame or any other part of the vehicle. The fixed contacts 25 and 26 are insulated from the casing 10 as at 29 (Figure 3).

Within the casing 10 is arranged a pair of bell crank levers 32 and 33 pivotally connected to the bottom of the casing 10 as at 34. Each of the bell crank levers is provided with an arm 35 to which is connected one end of a tension spring 36. The other ends of these tension springs cross each other and are connected as at 37 to the respective arms 17 and 18. The springs 36, accordingly, tend to swing the arms 17 and 18 toward each other to maintain engagement between the bosses 19 and 20 and the cam 13.

Each lever 32 and 33 is provided with a second arm 40, the extremities of which overlap and are slotted as at 41 to receive a pin 42. This pin is carried by an adjusting screw 45 extended through the casing 10 and threaded in a rotary adjusting sleeve 46.

As previously stated, the present device is primarily intended for controlling an eletric circuit. To this end, a wire 48 is connected to one of the stationary contacts 25 or 26 and these contacts are connected to each other by a wire 49.

Operation

The springs 36 are so tensioned as to maintain the bosses or abutments 19 and 20 in engagement with the outer surfaces of the cam 13. It particularly will be noted that the contact points of the abutments 19 with the cam are out of phase with the cam faces. In the case of a square cam, the abutment contact points with the cam will be preferably 135° apart so that when one abutment contacts a high point 14 of the cam, the other abutment will engage one of the faces 15 substantially centrally of the length thereof. Under such conditions, with the cam 13 rotated below a predetermined speed, at least one abutment will be in contact with the cam through the length of the periphery thereof during every successive rotation of the cam. Therefore, at least one of the contacts 23 or 24 will be in engagement with its associated fixed contact 25 or 26, and a circuit will be completed through wire 48, one or both stationary contacts, one or both movable contacts 23 or 24, through the casing 10 to ground 28, thence through the source of current and the solenoid or other device (not shown) to be controlled.

It will be noted that the cam 13, which may be statically and dynamically balanced, is the only element positively driven by the shaft 12. The cam faces serve to reduce the force required for moving the arms 16 and 17 outwardly together with the weights 21 and 22. Accordingly, the loading of the shaft 12 is minmized, thus making it practicable to drive the governor device from a relatively weak shaft such as the speedometer shaft of a motor vehicle. Additionally, it will be noted that while one abutment 19 or 20 is being moved outwardly from the center of the shaft 12 by one of the cam faces thereof, the other abutment is moving inwardly assisted by the force of its spring 36, thus tending to impart a rotational force to the shaft 12, at least partially counterbalancing the force required for moving the first-mentioned abutment outwardly. This further minimizes strains on the shaft 12.

As previously stated, the abutments 19 and 20 follow the contour of the cam 13 below the given rotational speed of the shaft 12. Due to the inertia of the weights 21 and 22, and depending upon the tensioning of the springs 36, a point in the speed of rotation of the shaft 12 will be reached wherein the inertia of each weight 21 and 22, tending to maintain outward movement of the associated arm 16 or 17, will prevent the associated abutment from accurately following the contour of the cam 13. This point will be reached in accordance with the tensioning of the springs 36 in a manner to be described, and at such point, each abutment 19 and 20, passing beyond a high point 14 of the cam, will not move inwardly to engage its contact 23 or 24 with the associated stationary contact until the other contact 23 or 24 has been moved positively out of engagement with its associated stationary contact. At such point, the circuit through both wires 48 and 49 will be broken, and the device to be controlled (not shown) will be de-energized.

The device includes highly simplified and readily accessible means for determining the shaft speed at which the circuit will be broken. If it is desired to increase the operative speed at which the circuit will be broken, the adjusting sleeve 46 may be turned to the left to move the lever arms 40 inwardly, thus moving the arms 35 further apart to increase the tensioning of the springs 36. Thus, these springs will exert an increased force tending to swing the arms 16 and 17 inwardly, and the circuit will be broken at a higher speed. Conversely, the operative speed may be reduced by turning the sleeve 46 to the right to reduce the tensioning of the springs 36. The spring force tending to move the arms 17 and 18 inwardly thus will be reduced and the inertia of the weights 21 and 22 will become effective at a lower predetermined speed to break the circuit through wire 48.

The weight arms are preferably so designed as to be of equal inertia and the springs 36 are preferably identical. It will be apparent that the operation of the single adjusting screw 45, with the bell crank levers 32 and 33 also identically formed, will equally increase or reduce the tensioning of the springs 36 when the sleeve 46 is adjusted. In Figure 2 of the drawing, the arm 17 is shown approximately in the position it will occupy between a pair of adjacent high points 14 of the cam when the shaft 12 is driven at a circuit-breaking speed for a given tensioning of the springs 36. Under such conditions, the abutment 20 will not contact the adjacent face 15 until the next adjacent high point 14 is almost in alignment with such abutment. This operation is duplicated by the abutment 19 in the next successive phase of operation as will be apparent.

As stated above, any type of generally polygonal symmetrical cam 13 may be employed, and under all conditions, the abutments 19 and 20 will be out of phase with the cam to provide the results referred to above. Since the drive shaft is substantially relieved of all inertia loads, it is wholly practicable to drive the device from the relatively weak speedometer shaft of a motor vehicle. The device also is extremely simple in construction and economical to manufacture and may be mounted in a relatively small space on a vehicle.

If desired, other uses may be made of the device. For example, either weight arm 16 or 17 may be used in a signal circuit with its associated contact 25 or 26. The circuit will be alternately made and broken below a predetermined speed of the shaft 12. Above such speed, the circuit will remain broken since such weight arm will be held out of engagement with its associated stationary contact by its inertia.

It is to be understood that the form of the invention shown and described is to be taken only as being illustrative, the scope of the invention being defined in the appended claims.

I claim:

1. A governor comprising a drive shaft, a symmetrical cam carried by said shaft and contoured to provide equidistantly spaced high points and intermediate low points, a pair of freely movable arms having portions engaging said cam in out-of-phase relation therewith, a weight carried by each arm, a pair of levers, a spring connected at one end to each of said levers and at its other end to one of said arms to urge said arms inwardly toward said shaft, and means for turning said levers to adjust the tension of said springs.

2. A device constructed in accordance with claim 1 wherein said levers are bell crank levers and each spring is connected to one arm of one of said levers, the other arms of said levers overlapping and having coincidental slots, said means for turning said levers comprising a pin arranged in said slots, and means for moving said pin to turn said levers.

3. A governor comprising a drive shaft, a symmetrical cam carried by said shaft and contoured to provide a plurality of equidistantly spaced high points and intermediate low points, a common pivot pin, a pair of arms each having one end connected to said common pivot pin and each having a portion engagable with said cam, such portion of one arm contacting with a high point on said cam while said portion of the other arm engages said cam intermediate a pair of said high points, a weight carried by each arm, a pair of tension springs each having one end connected to one of said arms, and common means for simultaneously and equally adjusting the tension of said springs.

4. A governor comprising a drive shaft, a symmetrical cam carried by said shaft and contoured to provide a plurality of equidistantly spaced high points and intermediate low points, a common pivot pin, a pair of arms each having one end connected to said common pivot pin and each having a portion engagable with said cam, such portion of one arm contacting with a high point on said cam while said portion of the other arm engages said cam intermediate a pair of said high points, a weight carried by each arm, a pair of tension springs each having one end connected to one of said arms, a pair of bell crank levers each having an arm connected to the other end of one of said springs, and means for simultaneously moving the other arms of said bell crank levers to vary the tension of said springs.

5. A governor comprising a drive shaft, a symmetrical cam carried by said shaft and provided with a plurality of equidistantly spaced high points and intermediate low points, a pair of freely pivoted arms each having a portion engagable with said cam, said portion of each arm being engageable with a high point on said cam when said portion of the other arm is adjacent a low point on said cam, means biasing said arms for movement toward said shaft, weights carried by said arms, a contact carried by each arm, and a stationary contact associated with each of said first-named contacts and engagable therewith when said portion of the associated arm is intermediate an adjacent pair of high points on said cam.

6. A device constructed in accordance with claim 5 wherein said biasing means comprises a pair of springs each having one end connected to one of said arms.

7. A device constructed in accordance with claim 5 wherein said biasing means comprises a pair of springs each having one end connected to one of said arms, and means for simultaneously adjusting the tension of said springs.

8. A device constructed in accordance with claim 5 wherein said biasing means comprises a pair of springs each having one end connected to one of said arms, a lever having one end connected to the other end of each of said springs, and means for simultaneously and equally swinging said levers to equally adjust the tension of said springs.

9. A device constructed in accordance with claim 5 wherein said biasing means comprises a pair of springs each having one end connected to one of said arms, a pair of bell crank levers each having one arm connected to the other end of one of said springs, the other arms of said bell crank levers being arranged adjacent each other, and a single operating means engagable with said other arms of said bell crank levers for swinging said levers simultaneously to an equal extent to equally adjust the tension of said springs.

References Cited in the file of this patent

UNITED STATES PATENTS

| | | |
|---|---|---|
| 2,286,611 | Farmer | June 16, 1942 |
| 2,681,221 | Randol | June 15, 1954 |

FOREIGN PATENTS

| | | |
|---|---|---|
| 352,853 | Great Britain | July 16, 1931 |
| 732,911 | France | June 27, 1932 |